(12) United States Patent
Wang et al.

(10) Patent No.: US 10,930,304 B2
(45) Date of Patent: Feb. 23, 2021

(54) PROCESSING VOICE (71) Applicant: BEIJING XIAOMI MOBILE SOFTWARE CO., LTD., Beijing (CN)

(72) Inventors: Zhao Wang, Beijing (CN); Lingsong Zhou, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 126 days.

(21) Appl. No.: 16/357,030

(22) Filed: Mar. 18, 2019

(65) Prior Publication Data
US 2019/0295569 A1 Sep. 26, 2019

(30) Foreign Application Priority Data
Mar. 26, 2018 (CN) .......................... 201810251444.0

(51) Int. Cl.
*G10L 25/84* (2013.01)
*G10L 15/20* (2006.01)
(Continued)

(52) U.S. Cl.
CPC .............. *G10L 25/84* (2013.01); *G10L 15/20* (2013.01); *H04R 3/005* (2013.01); *H04R 27/00* (2013.01);
(Continued)

(58) Field of Classification Search
CPC ... G06F 3/04817; G06F 3/167; G10L 15/063; G10L 15/144; G10L 15/20; G10L 15/22;
(Continued)

(56) References Cited

U.S. PATENT DOCUMENTS 9,135,924 B2 * 9/2015 Hayakawa .......... G10L 21/0208
10,026,399 B2 * 7/2018 Gopalan ................. G10L 15/22
(Continued)

FOREIGN PATENT DOCUMENTS

CN 101685153 A 3/2010
CN 101762806 A 6/2010
(Continued)

OTHER PUBLICATIONS

First Office Action and Search Report issued in Chinese Application No. 201810251444.0 dated Mar. 16, 2020, with English translation, (21p).
(Continued)

*Primary Examiner* — Gerald Gauthier
(74) *Attorney, Agent, or Firm* — Arch & Lake LLP (57) ABSTRACT

A method and an apparatus for processing voice are provided. The method is applied to a decision-making device in communication with a distributed microphone array and the distributed microphone array comprises a plurality of sub-arrays. The method comprises: obtaining, for each sub-array, an awakening voice signal received by each microphone of the sub-array; determining, for each sub-array, a frequency domain signal corresponding to each awakening voice signal of the sub-array, and a first cross-correlation function between every two frequency domain signals; determining an awakened sub-array based on each first cross-correlation function for each sub-array.

15 Claims, 6 Drawing Sheets

(51) Int. Cl.
  *H04R 3/00* (2006.01)
  *H04R 27/00* (2006.01)
  *G10L 15/08* (2006.01)
  *G10L 21/0216* (2013.01)
(52) U.S. Cl.
  CPC .............. *G10L 2015/088* (2013.01); *G10L 2021/02166* (2013.01); *H04R 2201/401* (2013.01); *H04R 2227/005* (2013.01); *H04R 2227/009* (2013.01); *H04R 2430/21* (2013.01)
(58) Field of Classification Search
  CPC .............. G10L 15/28; G10L 2015/088; G10L 2021/0208; G10L 2021/02166; G10L 25/84; G10L 15/05; G10L 15/08; G10L 15/30; G10L 21/0208; G10L 21/028; G10L 21/0364; H04R 2201/401; H04R 2227/005; H04R 2227/009; H04R 2430/21; H04R 27/00; H04R 29/004; H04R 3/005; H04R 1/406; H04R 3/12; G06N 3/08; G11B 27/034; H04N 7/15; H04S 7/301
  USPC .......... 704/233, 270; 348/14.07; 381/66, 92, 381/102; 386/224
  See application file for complete search history.

(56) References Cited

U.S. PATENT DOCUMENTS

| | | | | |
|---|---|---|---|---|
| 10,224,023 | B2* | 3/2019 | Chien | G10L 15/063 |
| 10,573,321 | B1* | 2/2020 | Smith | G10L 15/30 |
| 10,606,555 | B1* | 3/2020 | Wilberding | H04N 21/42203 |
| 10,621,980 | B2* | 4/2020 | Kim | G10L 15/28 |
| 10,692,518 | B2* | 6/2020 | Sereshki | H04R 3/005 |
| 10,755,705 | B2* | 8/2020 | Li | G10L 15/00 |
| 10,762,900 | B2* | 9/2020 | Ben-dor | G10L 17/00 |
| 2011/0026730 | A1* | 2/2011 | Li | H04R 3/005 |
| | | | | 381/92 |
| 2011/0052139 | A1* | 3/2011 | Oku | H04N 5/23218 |
| | | | | 386/224 |
| 2013/0304475 | A1* | 11/2013 | Gratke | H04R 3/00 |
| | | | | 704/270 |
| 2014/0286497 | A1* | 9/2014 | Thyssen | H04R 3/005 |
| | | | | 381/66 |
| 2015/0156598 | A1* | 6/2015 | Sun | H04N 7/15 |
| | | | | 348/14.07 |
| 2016/0163327 | A1* | 6/2016 | Christoph | H04S 7/30 |
| | | | | 381/102 |
| 2017/0076720 | A1* | 3/2017 | Gopalan | G10L 15/22 |
| 2017/0092287 | A1* | 3/2017 | Mizumoto | H04R 3/005 |
| 2017/0116994 | A1* | 4/2017 | Wang | G10L 15/22 |
| 2017/0140771 | A1* | 5/2017 | Taniguchi | G10L 15/05 |
| 2017/0164101 | A1* | 6/2017 | Rollow, IV | H04R 3/005 |
| 2017/0287499 | A1* | 10/2017 | Duong | H04R 3/005 |
| 2017/0301371 | A1* | 10/2017 | Anand | G11B 27/34 |
| 2017/0332168 | A1* | 11/2017 | Moghimi | G10L 21/0208 |
| 2018/0047386 | A1* | 2/2018 | Garner | G10L 15/08 |
| 2018/0091915 | A1* | 3/2018 | Eronen | H04S 7/30 |
| 2019/0104357 | A1* | 4/2019 | Atkins | H04R 1/406 |
| 2019/0179597 | A1* | 6/2019 | Tull | G06F 3/165 |
| 2019/0295569 | A1* | 9/2019 | Wang | H04R 27/00 |
| 2019/0318755 | A1* | 10/2019 | Tashev | G06N 3/08 |
| 2020/0068297 | A1* | 2/2020 | Rollow, IV | H04R 3/005 |

FOREIGN PATENT DOCUMENTS

| | | |
|---|---|---|
| CN | 203882609 U | 10/2014 |
| CN | 104142492 A | 11/2014 |
| CN | 104181506 A | 12/2014 |
| CN | 106604181 A | 4/2017 |
| CN | 107102296 A | 8/2017 |
| CN | 107199572 A | 9/2017 |
| CN | 107202976 A | 9/2017 |
| CN | 107346661 A | 11/2017 |
| CN | 107622767 A | 1/2018 |
| KR | 101767928 B1 | 8/2017 |

OTHER PUBLICATIONS

Extended European Search Report issued in European Application No. 191648658 dated Jul. 26, 2019, (9p).

Zhang, Qiaolin et al., "Microphone Clustering and BP Network based Acoustic Source Localization in Distributed Microphone Arrays" Advances in Electrical and Computer Engineering, vol. 13, No. 4, Jan. 1, 2013, (9p).

Valin J M et al, "Localization of Simultaneous Moving Sound Sources for Mobile Robot Using a Frequency-Domain Steered Beamformer Approach". arXiv preprint arXiv:1602.08629, 2016, 6 pages.

* cited by examiner

PROCESSING VOICE

CROSS REFERENCE TO RELATED APPLICATION

This application claims priority to Chinese Patent Application No. 201810251444.0 and filed on Mar. 26, 2018, the entire content of which is incorporated herein by reference.

TECHNICAL FIELD

The present disclosure relates to the field of artificial intelligence technology, and in particular, to methods and devices for processing voice.

BACKGROUND

With continuous development of artificial intelligence technology, a method of processing a voice signal based on a distributed microphone array has gradually become a new research hotspot and its importance in intelligent household is further highlighted. When an intelligent device is awakened by a user in a household scenario, a plurality of intelligence devices in the household may respond simultaneously, thereby severely affecting use experiences.

SUMMARY

According to a first aspect of an example of the present disclosure, there is provided a method of processing voice. The method may be applied to a decision-making device based on a distributed microphone array. The distributed microphone array may include a plurality of sub-arrays. The method may include: obtaining, for each sub-array, an awakening voice signal received by each microphone of the sub-array; determining, for each sub-array, a frequency domain signal corresponding to each awakening voice signal of the sub-array, and a first cross-correlation function between every two frequency domain signals; and determining an awakened sub-array to be awakened by a corresponding awakening voice signal in the sub-arrays based on each first cross-correlation function for each sub-array.

According to a second aspect of an example of the present disclosure, there is provided an apparatus for processing voice. The apparatus may be applied to a decision-making device based on a distributed microphone array and the distributed microphone array includes a plurality of sub-arrays. The apparatus may include: an obtaining module, configured to obtain, for each sub-array, an awakening voice signal received by each microphone of the sub-array; a first determining module, configured to determine, for each sub-array, a frequency domain signal corresponding to each awakening voice signal of the sub-array, and a first cross-correlation function between every two frequency domain signals; and a second determining module, configured to determine an awakened sub-array to be awakened by a corresponding awakening voice signal in the sub-arrays based on each first cross-correlation function for each sub-array.

According to a third aspect of an example of the present disclosure, there is provided an apparatus for processing voice. The apparatus may be applied to a decision-making device based on a distributed microphone array and the distributed microphone array includes a plurality of sub-arrays. The apparatus may include: a processor; and a storage medium storing instructions executable by the processor. The processor is configured to: obtain, for each sub-array, an awakening voice signal received by each microphone of the sub-array; determine, for each sub-array, a frequency domain signal corresponding to each awakening voice signal of the sub-array, and a first cross-correlation function between every two frequency domain signals; and determine an awakened sub-array to be awakened by a corresponding awakening voice signal in the sub-arrays based on each first cross-correlation function for each sub-array.

It is understood that the above general descriptions and subsequent detailed descriptions are merely illustrative and explanatory and shall not be limiting of the present disclosure.

BRIEF DESCRIPTION OF DRAWINGS

The accompanying drawings, which are incorporated in and constitute a part of the present description, illustrate examples consistent with the present disclosure and serve to explain the principles of the present disclosure together with the description.

DETAILED DESCRIPTION

Examples will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are examples of an apparatus and a method consistent with some aspects of the present disclosure described in detail in the appended claims.

The terminology used in the present disclosure is for the purpose of describing a particular example only, and is not intended to be limiting of the present disclosure. The singular forms such as "a", 'said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, these information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

Figure 1:
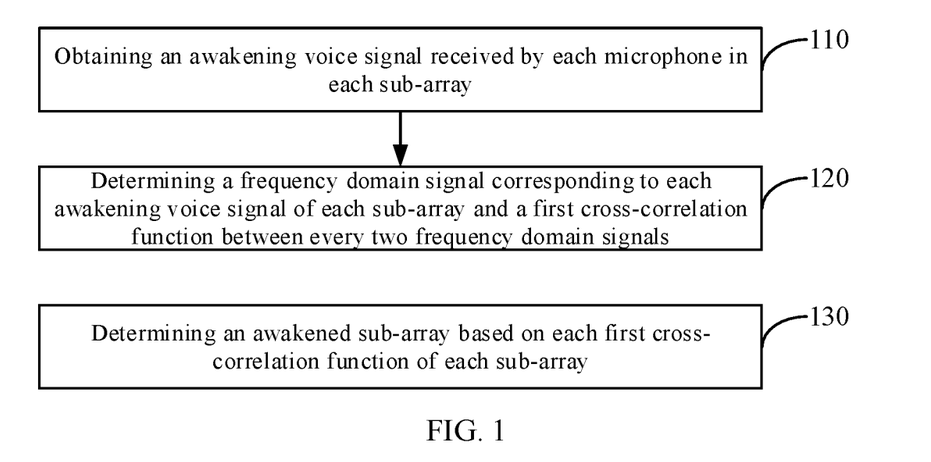
FIG. 1 a flowchart illustrating a method of processing voice according to an example of the present disclosure.
Figure 2:
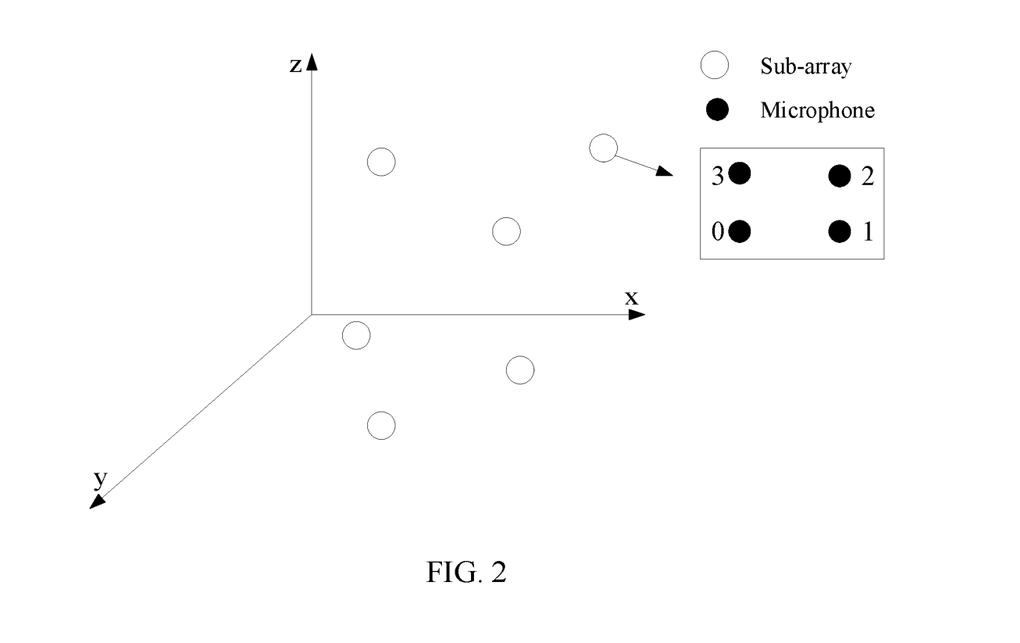
FIG. 2 is a schematic diagram illustrating distributions of a distributed microphone array and its sub-arrays according to an example of the present disclosure.

FIG. 1 is a flowchart illustrating a method of processing voice according to an example of the present disclosure. FIG. 2 is a schematic diagram illustrating distributions of a distributed microphone array and its sub-arrays according to an example of the present disclosure. The method of processing voice may be applied to a decision-making device based on a distributed microphone array, the distributed microphone array including a plurality of sub-arrays. As shown in FIG. 1, the method of processing voice may include the following blocks 110-130.

At block 110, for each sub-array, an awakening voice signal received by each microphone of the sub-array is obtained.

In an example, the distributed microphone array may be used to represent a plurality of intelligent terminals and each sub-array may be used to represent one intelligent terminal. A decision-making device for performing the method of processing voice may be separately deployed and may also be deployed on an intelligent terminal. For example, the decision-making device may be an electronic device in communication with the distributed microphone array. The decision-making device may be an intelligent terminal corresponding to each microphone array, or may be a software or hardware apparatus deployed on an intelligent terminal, or may be a server communicating directly or indirectly with each microphone array or each intelligent terminal, or may be a software or hardware apparatus deployed on the server, which is only illustrative and shall not constitute limitation.

After a user sends an awakening voice signal, each sub-array may receive the awakening voice signal. At this time, the decision-making device needs to determine an awakened sub-array corresponding to the awakening voice signal of the user, that is, an awakened device most suitable for interaction with the user.

For example, $x_m(t)$ and $x_n(t)$ are awakening voice signals received by the m-th microphone and the n-th microphone in a sub-array, the voice signal is represented by a signal frame with a fixed frame length, for example, by a signal frame with a frame length of 8 milliseconds, and $x_m^1(t)$ and $x_n^1(t)$ indicate signals of a first frame.

At block 120, a frequency domain signal corresponding to each of the awakening voice signals of each sub-array and a first cross-correlation function between each two of the frequency domain signals are determined.

In an example, the awakening voice signal received by each sub-array is a time-domain signal and the frequency domain signal corresponding to each awakening voice signal may be obtained by performing frequency domain transform for each time-domain signal. The correlation among a plurality of obtained frequency domain signals may be represented by a first cross-correlation function.

The first cross-correlation function $R_{ij}(\tau)$ between every two frequency domain signals may be calculated based on a formula (1) as follows:

$$R_{ij}(\tau)=\Sigma_{k=0}^{L-1}X_i(k)X_j(k)e^{-j2\pi k\tau/L} \qquad \text{Formula (1)}$$

In the formula, $X_i(k)$ and $X_j(k)$ refer to frequency domain signals corresponding to awakening voice signals received by the i-th microphone and the j-th microphone in a sub-array respectively, a frame length is L and $\tau$ refers to a delay between two time domain signals relative to an initial time.

At block 130, an awakened sub-array is determined based on first cross-correlation functions of each sub-array.

In an example, for each sub-array, a value representing magnitude of a signal received by the sub-array may be firstly determined according to each first cross-correlation function of the sub-array and then it is determined which sub-array may be selected as a sub-array to be awakened (referred to an awakened sub-array) based on these values.

In an example, for each sub-array, a mean value of each first cross-correlation function of the sub-array may be firstly calculated and then a sub-array corresponding to a maximum mean value is determined as the awakened sub-array, where the mean value represents a magnitude of a signal received by a corresponding sub-array.

FIG. 2 illustrates distributions of a distributed microphone array and its sub-arrays. In an illustrative scenario, the distributed microphone array will be described with six sub-arrays as an example, where each sub-array includes four microphones.

In the present disclosure, when the decision-making device based on a distributed microphone array performs voice processing, the decision-making device may need to firstly obtain awakening voice signals received by a microphone 0, a microphone 1, a microphone 2 and a microphone 3 for each of the above six sub-arrays, and then determine frequency domain signals, i.e., $X_0(k)$, $X_1(k)$, $X_2(k)$ and $X_3(k)$ respectively corresponding to the received awakening voice signals, and first cross-correlation functions between every two frequency domain signals, i.e. $R_{01}(\tau)$, $R_{02}(\tau)$, $R_{03}(\tau)$, $R_{12}(\tau)$, $R_{13}(\tau)$, and $R_{23}(\tau)$, and then determine a final awakened sub-array, that is, an intelligent terminal most suitable for interaction with a user, according to $R_{01}(\tau)$, $R_{02}(\tau)$, $R_{03}(\tau)$, $R_{12}(\tau)$, $R_{13}(\tau)$, and $R_{23}(\tau)$ included in each sub-array of the above six sub-arrays.

For example, a mean value of $R_{01}(\tau)$, $R_{02}(\tau)$, $R_{03}(\tau)$, $R_{12}(\tau)$, $R_{13}(\tau)$, and $R_{23}(\tau)$ may be calculated so that a sub-array corresponding to a maximum mean value is selected as the awakened sub-array, where the mean value represents a magnitude of a signal received by a corresponding sub-array.

It can be seen from the above example that the awakening voice signals received by the microphones in each sub-array are obtained, and the frequency domain signals corresponding to the awakening voice signals of each sub-array and the first cross-correlation functions between every two frequency domain signals are determined and then the awakened sub-array is determined according to the first cross-correlation functions of each sub-array. In this way, a corresponding awakened sub-array may be determined in a frequency domain of a voice signal, thereby improving the accuracy of the awakening decision of the distributed device.

Figure 3:
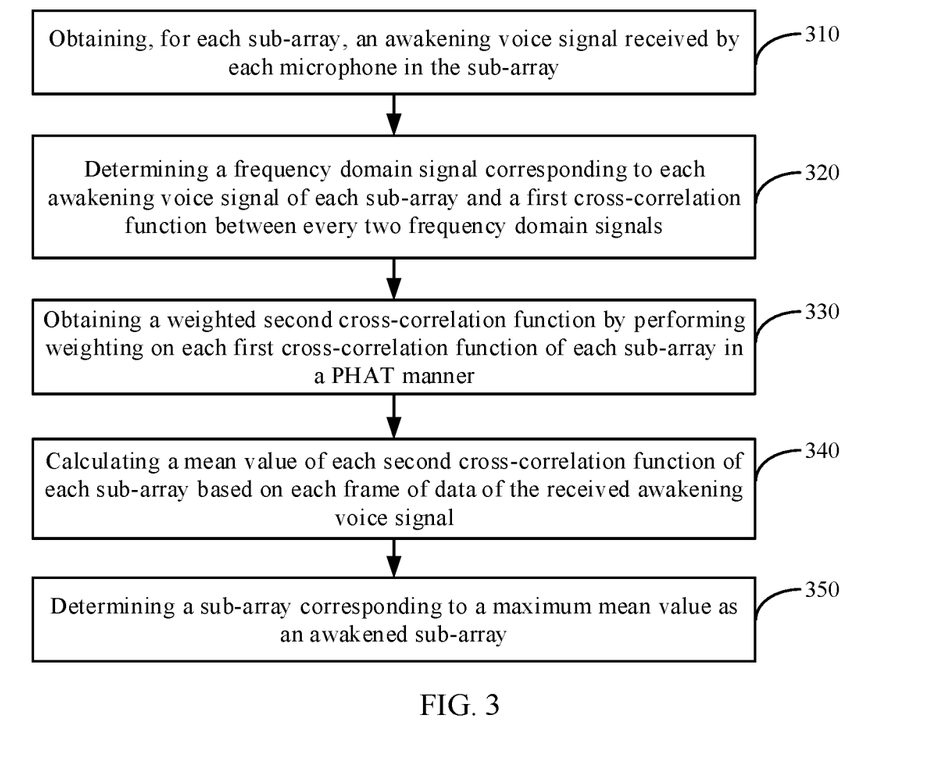
FIG. 3 is a flowchart illustrating a method of processing voice according to another example of the present disclosure.

FIG. 3 is a flowchart illustrating a method of processing voice according to another example of the present disclosure. The method of processing voice may be applied to a decision-making device based on a distributed microphone array. The distributed microphone array includes a plurality of sub-arrays. On the basis of the method of FIG. 1, the method of processing voice may include blocks 310-350 below.

At block 310, for each sub-array, an awakening voice signal received by each microphone in the sub-array is obtained. This block is same as block 110 and therefore will not be repeated herein.

At block 320, a frequency domain signal corresponding to each of the awakening voice signals of each sub-array and a first cross-correlation function between every two frequency domain signals are determined. This block is same as block 120, and will not be repeated herein.

At block 330, a weighted second cross-correlation function is obtained by performing weighting on each first cross-correlation function of each sub-array in a Phase Transform (PHAT) manner.

In an example of the present disclosure, the weighted second cross-correlation function $R^{(w)}_{ij}(\tau)$ between every two frequency domain signals may be calculated based on the formula (2) as follows:

$$R^{(w)}_{ij}(\tau) = \sum_{k=0}^{L-1} \frac{X_i(k)X_j(k)e^{-j2\pi k\tau/L}}{|X_i(k)||X_j(k)|} \quad \text{Formula (2)}$$

In the above formula, $X_i(k)$ and $X_j(k)$ are frequency domain signals corresponding to awakening voice signals received by the i-th microphone and the j-th microphone in a sub-array and a frame length is L.

At block 340, for each sub-array, a mean value of each second cross-correlation function of the sub-array is calculated based on each frame of data of the received awakening voice signal, where the mean value represents a magnitude of a signal received by a corresponding sub-array.

At block 350, a sub-array corresponding to a maximum mean value is determined as an awakened sub-array.

As can be seen from the above example, when an awakened sub-array is determined, the weighted second cross-correlation function is obtained by performing weighting on each first cross-correlation function of each sub-array in the PHAT manner, the mean value of the second cross-correlation functions of each sub-array is calculated and then a sub-array corresponding to the maximum mean value is determined as the awakened sub-array, where the mean value represents a magnitude of a signal received by a corresponding sub-array. In this way, sharp correlation peak characteristics may be avoided, and the reliability of an awakening decision of the distributed device may be improved.

Figure 4:
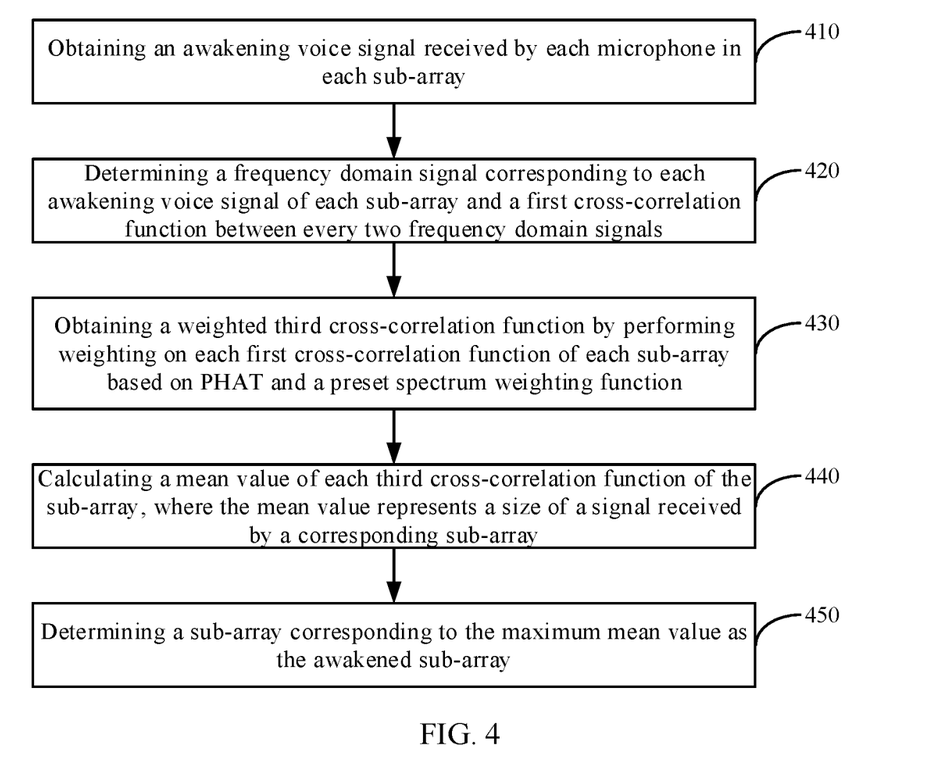
FIG. 4 is a flowchart illustrating a method of processing voice according to still another example of the present disclosure.

FIG. 4 is a flowchart illustrating a method of processing voice according to still another example of the present disclosure. The method of processing voice may be applied to a decision-making device based on a distributed microphone array. The distributed microphone array includes a plurality of sub-arrays. On the basis of the method of FIG. 1, the method of processing voice may include blocks 410-450 below.

At block 410, for each sub-array, an awakening voice signal received by each microphone in the sub-array is obtained. This block is same as block 110 and will not be repeated herein.

At block 420, a frequency domain signal corresponding to each of the awakening voice signals of each sub-array and a first cross-correlation function between every two frequency domain signals are determined. This block is same as block 120 and will not be repeated herein.

At block 430, a weighted third cross-correlation function is obtained by performing weighting on each first cross-correlation function of each sub-array based on PHAT and a preset spectrum weighting function.

In an example of the present disclosure, the weighted third cross-correlation function $R^{(e)}_{ij}(\tau)$ between every two frequency domain signals may be calculated based on the formula (3) as follows:

$$R^{(e)}_{ij}(\tau) = \sum_{k=0}^{L-1} \frac{w(k)^2 X_i(k)X_j(k)e^{-j2\pi k\tau/L}}{|X_i(k)||X_j(k)|} \quad \text{Formula (3)}$$

In the formula, $X_i(k)$ and $X_j(k)$ are frequency domain signals corresponding to awakening voice signals received by the i-th microphone and the j-th microphone in a sub-array and a frame length is L; w(k) is a preset spectrum weighting function, a weight value of which corresponds to a signal-to-noise ratio of each microphone in the sub-array, that is, the weight value of the spectrum weighting function is larger at a frequency point with a high signal-to-noise ratio.

Also, the spectrum weighting function w(k) may be calculated based on the formula (4) as follows:

$$w(k) = \begin{cases} 1, & Y(k) < Y_n(k) \\ \left(\frac{Y(k)}{Y_n(k)}\right)^\gamma, & \text{others} \end{cases} \quad \text{Formula (4)}$$

In the formula, Y(k) is an average energy spectrum density of a microphone, $Y_n(k)$ is a noise characteristic estimated through previous Y(k), and the value of γ is greater than 0 and less than 1.

At block 440, for each sub-array, a mean value of each third cross-correlation function of the sub-array is calculated, where the mean value represents a magnitude of a signal received by a corresponding sub-array.

In an example, when the mean value of each third cross-correlation function of each sub-array is calculated, a preset spherical mesh may be used to reduce an operation amount. The spherical mesh may include a plurality of discrete points. The mean value of each third cross-correlation function of each sub-array is calculated based on a Steered Response Power (SRP)-PHAT algorithm as follows:

(1) A spherical mesh is set and the spherical mesh includes a plurality of discrete points.

For example, a uniformly-distributed spherical triangle mesh is firstly defined. To establish the spherical mesh, one regular tetrahedron is recursively generated, initially from a regular icosahedron, by extending outwardly a center of each equilateral triangle in 20 faces of the regular icosahedron. Through two recursions, 2562 end points may be generated and then quantized onto one unit sphere so that establishment of discrete spherical points is completed with accuracy of 2.5 degrees.

(2) A value of each third cross-correlation function of each sub-array is determined at each discrete point.

In an exemplary scenario, a distributed microphone array as shown in FIG. 2 includes six sub-arrays and each sub-array includes four microphones. For this case, similar to obtaining the first cross-correlation functions as above, each sub-array may correspond to six third cross-correlation functions, i.e., $R_{01}^{(e)}(\tau)$, $R_{02}^{(e)}(\tau)$, $R_{03}^{(e)}(\tau)$, $R_{12}^{(e)}(\tau)$, $R_{13}^{(e)}(\tau)$ and $R_{23}^{(e)}(\tau)$. For the above 2562 discrete points, the values of the six third cross-correlation functions of each discrete point may be solved. Since position information of each discrete point on the spherical mesh is different, the $\tau$ value of each third cross-correlation function of each discrete point is also different. For a sub-array, values of 2562×6 third cross-correlation functions may be obtained.

(3) A mean value of values of the third cross-correlation functions of each sub-array is calculated based on the values of the third cross-correlation functions of each sub-array.

Still with the distributed microphone array of FIG. 2 as an example, the mean value of the values of six third cross-correlation functions $R_{01}^{(e)}(\tau)$, $R_{02}^{(e)}(\tau)$, $R_{03}^{(e)}(\tau)$, $R_{12}^{(e)}(\tau)$, $R_{13}^{(e)}(\tau)$, $R_{23}^{(e)}(\tau)$ at each of the above 2562 discrete points is solved and then a maximum mean value of the obtained 2562 mean values is selected as a mean value of the sub-array.

At block 450, a sub-array corresponding to the maximum mean value is determined as the awakened sub-array.

As can be seen from the above example, when the awakened sub-array is determined, a weighted third cross-correlation function is obtained by performing weighting on each first cross-correlation function of each sub-array based on the PHAT and a preset spectrum weighting function, a mean value of third cross-correlation functions of each sub-array is calculated, and then a sub-array corresponding to a maximum mean value is determined as the awakened sub-array, where the mean value represents a magnitude of a signal received by a corresponding sub-array. In this way, the awakened sub-array is determined based on a frequency domain sphere correlation characteristics decision algorithm. With introduced PHAT and spectrum weighting, the capabilities of interference resistance, noise resistance and reverberation resistance become strong. At the same time, angular information carried by SRP algorithm allows a plurality of devices to accurately determine an interaction intention of an awakener based on an orientation when the devices are close to the awakener and then a correct awakened device is selected, thereby further improving the accuracy of the awakening decision of the distributed device.

Corresponding to the above examples of a method of processing voice, the present disclosure also provides an example of an apparatus for processing voice.

Figure 5:
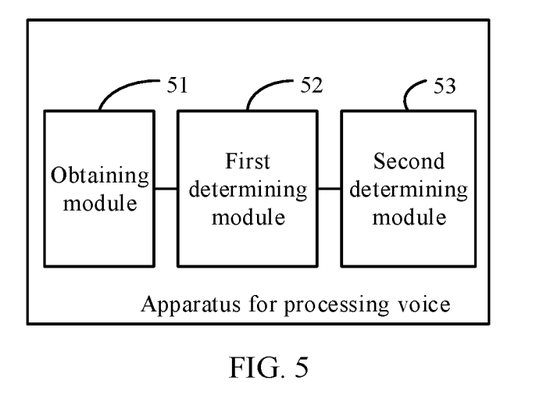
FIG. 5 is a block diagram illustrating an apparatus for processing voice according to an example of the present disclosure.

FIG. 5 is a block diagram illustrating an apparatus for processing voice according to an example of the present disclosure. The apparatus may be applied to a decision-making device based on a distributed microphone array, and the distributed microphone array includes a plurality of sub-arrays. Also, the apparatus is used to perform the method of processing voice in FIG. 1. The apparatus for processing voice may include:

an obtaining module 51, configured to obtain, for each sub-array, an awakening voice signal received by each microphone of the sub-array;

a first determining module 52, configured to determine, for each sub-array, a frequency domain signal corresponding to each awakening voice signal of the sub-array, and a first cross-correlation function between every two frequency domain signals; and a second determining module 53, configured to determine an awakened sub-array in the sub-arrays based on the first cross-correlation function for each sub-array.

As can be seen from the above example, an awakening voice signal received by each microphone in each sub-array is obtained, and a frequency domain signal corresponding to each awakening voice signal of each sub-array and the first cross-correlation function between every two frequency domain signals are determined and then the awakened sub-array is determined based on each first cross-correlation function of each sub-array. In this way, a corresponding awakened sub-array may be determined in a frequency domain of a voice signal, thereby improving the accuracy of the awakening decision of the distributed device.

Figure 6:
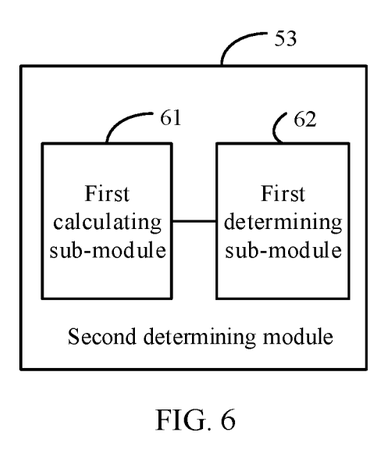
FIG. 6 is a block diagram illustrating an apparatus for processing voice according to another example of the present disclosure.

FIG. 6 is a block diagram illustrating an apparatus for processing voice according to another example of the present disclosure. The example is based on the above example of FIG. 5. The second determining module 53 may include:

a first calculating sub-module 61, configured to calculate, for each sub-array, a mean value of each first cross-correlation function of the sub-array based on each frame of data of the received awakening voice signal, where the mean value represents a magnitude of a signal received by a corresponding sub-array; and a first determining sub-module 62, configured to determine a sub-array corresponding to a maximum mean value as the awakened sub-array.

Figure 7:
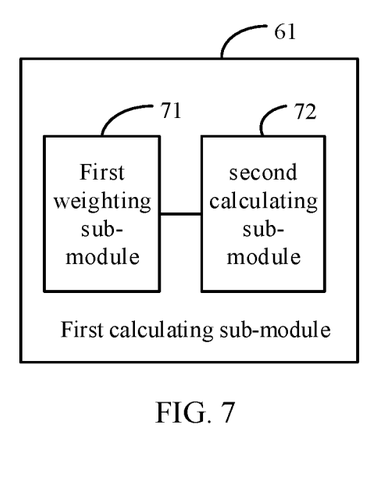
FIG. 7 is a block diagram illustrating an apparatus for processing voice according to still another example of the present disclosure.

FIG. 7 is a block diagram illustrating an apparatus for processing voice according to still another example of the present disclosure. The example is based on the above example of FIG. 6. The first calculating sub-module 61 includes:

a first weighting sub-module 71, configured to obtain a weighted second cross-correlation function by performing weighting on each first cross-correlation function of each sub-array in a Phase Transform weighting (PHAT) manner; and a second calculating sub-module 72, configured to calculate, for each sub-array, a mean value of each second cross-correlation function of the sub-array based on each frame of data of the received awakening voice signal.

As can be seen from the above example, when an awakened sub-array corresponding to an awakening voice signal is determined, a weighted second cross-correlation function is obtained by performing weighting on each first cross-correlation function of each sub-array in the PHAT manner, the mean value of each second cross-correlation function of each sub-array is calculated based on each frame of data of the received awakening voice signal and then a sub-array corresponding to a maximum mean value is determined as an awakened sub-array, where the mean value represents a magnitude of a signal received by a corresponding sub-array. In this way, sharper correlation peak characteristics may be avoided, and the reliability of an awakening decision of the distributed device may be improved.

Figure 8:
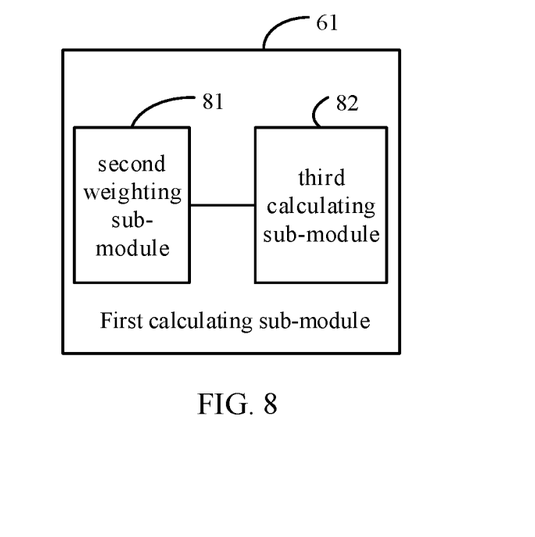
FIG. 8 is a block diagram illustrating an apparatus for processing voice according to yet another example of the present disclosure.

FIG. 8 is a block diagram illustrating an apparatus for processing voice according to yet another example of the present disclosure. The example is based on the above example of FIG. 6. The first calculating sub-module 61 may include:

a second weighting sub-module 81, configured to obtain a weighted third cross-correlation function by performing weighting on each first cross-correlation function of each sub-array based on the PHAT manner and a preset spectrum weighting function; and a third calculating sub-module 82, configured to calculate, for each sub-array, a mean value of each third cross-correlation function of the sub-array based on each frame of data of the received awakening voice signal.

In an example, a weight value of the preset spectrum weighting function adopted by the second weighting sub-module 81 corresponds to a signal-to-noise ratio of each microphone of the sub-array.

Figure 9:
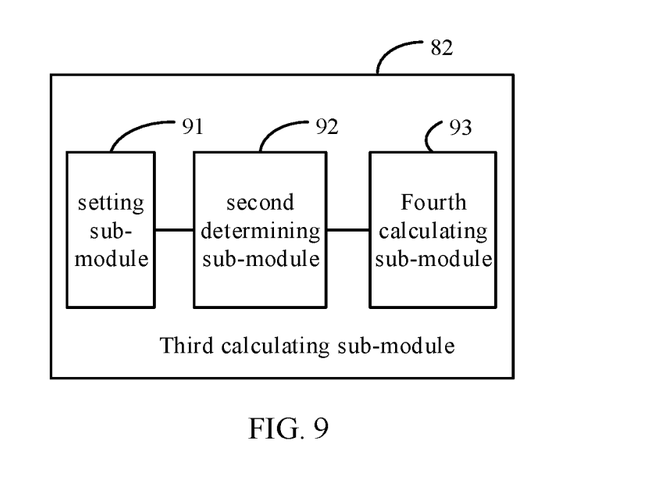
FIG. 9 is a block diagram illustrating an apparatus for processing voice according to yet another example of the present disclosure.

FIG. 9 is a block diagram illustrating an apparatus for processing voice according to yet another example of the present disclosure. The example is based on the above example of FIG. 8. The third calculating sub-module 82 may include:

a setting sub-module 91, configured to set to a spherical mesh where the spherical mesh includes a plurality of discrete points;

a second determining sub-module 92, configured to determine, for each sub-array, values of each third cross-correlation function of the sub-array at each discrete point; and a fourth calculating sub-module 93, configured to calculate, for each sub-array, a mean value of the values of each third cross-correlation function of the sub-array based on the values of each third cross-correlation function of the sub-array.

As can be seen from the above example, when an awakened sub-array corresponding to an awakening voice signal is determined, a weighted third cross-correlation function is obtained by performing weighting on each first cross-correlation function of each sub-array based on the PHAT manner and a preset spectrum weighting function, a mean value of each third cross-correlation function of each sub-array is calculated, and then a sub-array corresponding to a maximum mean value is determined as the awakened sub-array, where the mean value represents a magnitude of a signal received by a corresponding sub-array. In this way, the awakened sub-array is determined based on a frequency domain sphere correlation characteristics decision algorithm. With introduced PHAT and spectrum weighting, the capabilities of interference resistance, noise resistance and reverberation resistance become strong. In addition, angular information carried by SRP algorithm allows a plurality of devices to accurately determine an interaction intention of an awakener based on an orientation when the devices are close to the awakener and then a correct awakened device is selected, thereby further improving the accuracy of the awakening decision of the distributed device.

Corresponding to FIG. 5, the present disclosure also provides another apparatus for processing voice. The apparatus may be applied to a decision-making device based on a distributed microphone array and the distributed microphone array includes a plurality of sub-arrays, and the apparatus may include:

a processor and a storage medium storing processor-executable instructions;

wherein, the processor is configured to:

obtain, for each sub-array, an awakening voice signal received by each microphone of the sub-array;

determine, for each sub-array, a frequency domain signal corresponding to each awakening voice signal of the sub-array, and a first cross-correlation function between every two frequency domain signals; and determine an awakened sub-array to be awakened by a corresponding awakening voice signal in the sub-arrays based on each first cross-correlation function of each sub-array.

Details of the implementation process of the functions and effects of different units in the above-described apparatus may be seen from the implementation process of corresponding blocks in the above-described method, which will not be redundantly described herein.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

Figure 10:
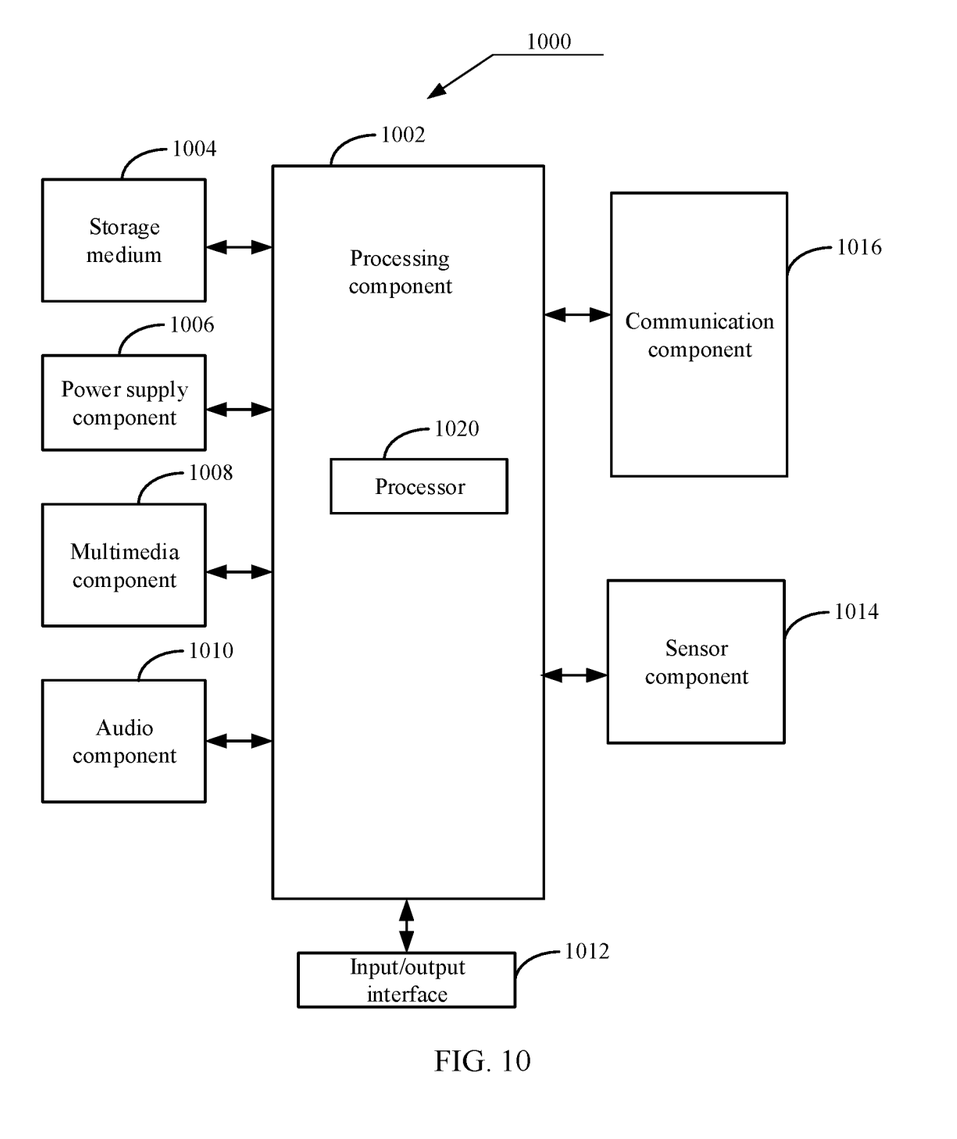
FIG. 10 is a schematic diagram illustrating a structure applicable to an apparatus for processing voice according to an example of the present disclosure.

FIG. 10 is a schematic diagram illustrating a structure applicable to an apparatus 1000 for processing voice according to an example of the present disclosure. For example, the apparatus 1000 may be a mobile phone, a computer, a digital broadcast terminal, a message transceiving device, a game console, a tablet device, a medical device, a fitness device and a personal digital assistant and so on, which have a routing function.

As shown in FIG. 10, the apparatus 1000 may include one or more of a processing component 1002, a storage medium 1004, a power supply component 1006, a multimedia component 1008, an audio component 1010, an input/output (I/O) interface 1012, a sensor component 1014 and a communication component 1016.

The processing component 1002 generally controls the overall operation of the apparatus 1000, such as operations associated with display, phone call, data communication, camera operation, and recording operations. The processing component 1002 may include one or more processors 1020 to execute instructions to complete all or a part of the blocks of the above method. In addition, the processing component 1002 may include one or more modules to facilitate the interaction between the processing component 1002 and other components. For example, the processing component 1002 may include a multimedia module to facilitate the interaction between the multimedia component 1008 and the processing component 1002.

The storage medium 1004 is configured to store different types of data to support operation at the apparatus 1000. Examples of such data include instructions, contact data, phonebook data, messages, pictures, videos, and so on for any application or method that operates on the apparatus 1000. The storage medium 1004 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or a compact disk.

The power supply component 1006 provides power to different components of the apparatus 1000. The power supply component 1006 may include a power management system, one or more power sources, and other components associated with generating, managing and distributing power for the apparatus 1000.

The multimedia component 1008 includes a screen providing an output interface between the apparatus 1000 and a user. In some examples, the screen may include a Liquid Crystal Display (LCD) and/or a Touch Panel (TP). If the screen includes a touch panel, the screen may be implemented as a touch screen to receive an input signal from a user. The touch panel includes one or more touch sensors to sense touch, slip and gestures on the touch panel. The touch sensor may not only sense the boundary of a touch or slip operation but also detect duration and pressure relating to the touch or slip operation. In some examples, the multimedia component 1008 may include a front camera and/or a rear camera. When the apparatus 1000 is in an operating mode, such as in a shooting mode or a video mode, the front camera and/or the rear camera may receive external multimedia data. Each of the front camera and the rear camera may be a fixed optical lens system or may have capabilities of focal length and optical zoom.

The audio component 1010 is configured to output and/or input an audio signal. For example, the audio component 1010 includes a microphone (MIC). When the apparatus 1000 is in an operating mode, for example, in a call mode, a recording mode or a speech recognition mode, the microphone is configured to receive an external audio signal. The received audio signal may be further stored in the storage medium 1004 or sent via the communication component 1016. In some examples, the audio component 1010 also includes a speaker for outputting an audio signal.

The I/O interface 1012 provides an interface between the processing component 1002 and a peripheral interface module. The peripheral interface module may be a keyboard, click wheel, a button and the like. Such buttons may include but not limited to: a home button, a volume button, a start button and a lock button.

The sensor component 1014 includes one or more sensors for evaluating states of the apparatus 1000 in different aspects. For example, the sensor component 1014 may detect the on/off state of the apparatus 1000, and relative locations of components, for example, the component is a display and a keypad of the apparatus 1000. The sensor component 1014 may also detect a position change of the apparatus 1000 or a component of the apparatus 1000, the presence or absence of contact of a user with the apparatus 1000, an orientation or acceleration/deceleration of the apparatus 1000 and a temperature change of the apparatus 1000. The sensor component 1014 may include a proximity sensor configured to detect presence of a nearby object without any physical contact. The sensor component 1014 may also include an optical sensor, such as a CMOS or CCD image sensor to be used in imaging application. In some examples, the sensor component 1014 may also include an acceleration sensor, a gyroscope sensor, a magnetic sensor, a pressure sensor, a microwave sensor or a temperature sensor.

The communication component 1016 is configured to facilitate wired or wireless communication between the apparatus 1000 and other devices. The apparatus 1000 may access a wireless network based on a communication standard, such as WIFI, 2G or 3G, or a combination thereof. In an example, the communication component 1016 may receive a broadcast signal or broadcast-related information from an external broadcast management system via a broadcast channel. In an example, the communication component 1016 may also include a Near Field Communication (NFC) module to facilitate short-range communications. For example, the NFC module may be implemented based on Radio Frequency Identification (RFID) technology, Infrared Data Association (IrDA) technology, Ultra Wide Band (UWB) technology, Bluetooth (BT) technology and other technology.

In an example, the apparatus 1000 may be implemented by one or more of an Application-Specific Integrated Circuit (ASIC), a Digital Signal Processor (DSP), a Digital Signal Processing Device (DSPD), a Programmable Logical Device (PLD), a Field Programmable Gate Array (FPGA), a controller, a microcontroller, a microprocessor or other electronic elements to perform the following method:

obtaining, for each sub-array, an awakening voice signal received by each microphone of the sub-array;

determining, for each sub-array, a frequency domain signal corresponding to each awakening voice signal of the sub-array, and a first cross-correlation function between every two frequency domain signals; and determining an awakened sub-array to be awakened by a corresponding awakening voice signal in the sub-arrays based on each first cross-correlation function for each sub-array.

In an example, there is also provided a non-transitory computer-readable storage medium storing instructions, for example, a storage medium 1004 storing instructions. The instructions may be executed by the processor 1020 of the apparatus 1000 to complete the above method. For example, the non-transitory computer readable storage medium may be a Read-Only Memory (ROM), a Random Access Memory (RAM), CD-ROM, a magnetic tape, a floppy disk, and an optical data storage device and so on.

Optionally, determining the awakened sub-array based on each first cross-correlation function for each sub-array includes:

calculating, for each sub-array, a mean value of each first cross-correlation function of the sub-array based on each frame of data of the received awakening voice signal, where the mean value is used to represent a magnitude of a signal received by a corresponding sub-array; and determining a sub-array corresponding to a maximum mean value as the awakened sub-array.

Optionally, calculating, for each sub-array, the mean value of each first cross-correlation function of the sub-array based on each frame of data of the received awakening voice signal includes:

obtaining a weighted second cross-correlation function by performing weighting on each first cross-correlation function of each sub-array in a phase transform weighting (PHAT) manner; and calculating, for each sub-array, a mean value of each second cross-correlation function of the sub-array based on each frame of data of the received awakening voice signal.

Optionally, calculating, for each sub-array, the mean value of each first cross-correlation function of the sub-array based on each frame of data of the received awakening voice signal includes:

obtaining a weighted third cross-correlation function by performing weighting on each first cross-correlation function of each sub-array based on a phase transform weighting (PHAT) manner and a preset spectrum weighting function; and calculating, for each sub-array, a mean value of each third cross-correlation function of the sub-array based on each frame of data of the received awakening voice signal.

Optionally, a weight value of the preset spectrum weighting function corresponds to a signal-to-noise ratio of each microphone of the sub-array.

Optionally, calculating, for each sub-array, the mean value of each third cross-correlation function of the sub-array includes:

setting a spherical mesh, where the spherical mesh includes a plurality of discrete points;

determining, for each sub-array, values of each third cross-correlation function of the sub-array at each discrete point; and calculating, for each sub-array, a mean value of the values of each third cross-correlation function of the sub-array based on the values of each third cross-correlation function of the sub-array.

Optionally, the second determining module includes:

a first calculating sub-module, configured to calculate, for each sub-array, a mean value of each first cross-correlation function of the sub-array based on each frame of data of the received awakening voice signal, where the mean value is used to represent a magnitude of a signal received by a corresponding sub-array; and a first determining sub-module, configured to determine a sub-array corresponding to a maximum mean value as the awakened sub-array.

Optionally, the first calculating sub-module includes:

a first weighting sub-module, configured to obtain a weighted second cross-correlation function by performing weighting on each first cross-correlation function of each sub-array in a phase transform weighting (PHAT) manner; and a second calculating sub-module, configured to calculate, for each sub-array, a mean value of each second cross-correlation function of the sub-array based on each frame of data of the received awakening voice signal.

Optionally, the first calculating sub-module includes:

a second weighting sub-module, configured to obtain a weighted third cross-correlation function by performing weighting on each first cross-correlation function of each sub-array based on a phase transform weighting (PHAT) manner and a preset spectrum weighting function; and a third calculating sub-module, configured to calculate, for each sub-array, a mean value of third cross-correlation function of the sub-array based on each frame of data of the received awakening voice signal.

Optionally, a weight value of the preset spectrum weighting function corresponds to a signal-to-noise ratio of each microphone of the sub-array.

Optionally, the third calculating sub-module includes:

a setting sub-module, configured to set a spherical mesh, where the spherical mesh includes a plurality of discrete points;

a second determining sub-module, configured to determine, for each sub-array, values of each third cross-correlation function of the sub-array at each discrete point; and a fourth calculating sub-module, configured to calculate, for each sub-array, a mean value of the values of each third cross-correlation function of the sub-array based on the values of each third cross-correlation function of the sub-array.

A technical solution provided in an example of the present disclosure may include the following benefits.

The decision-making device based on a distributed microphone array in the present disclosure may obtain a awakening voice signal received by each microphone in each sub-array, determine a frequency domain signal corresponding to each awakening voice signal of each sub-array and the first cross-correlation function between every two frequency domain signals and then determine an awakened sub-array according to each first cross-correlation function of each sub-array, thereby determining a corresponding awakened sub-array in a frequency domain of a voice signal and improving the accuracy of an awakening decision of the distributed device.

The decision-making device based on a distributed microphone array in the present disclosure may also obtain a weighted second cross-correlation function by performing weighting on each first cross-correlation function of each sub-array in the PHAT manner, calculate the mean value of second cross-correlation functions of each sub-array based on each frame of data of the received awakening voice signal and then determine a sub-array corresponding to a maximum mean value as an awakened sub-array, where the mean value represents a magnitude of a signal received by a corresponding sub-array. In this way, sharper correlation peak characteristics may be avoided, and the reliability of an awakening decision of the distributed device may be improved.

The decision-making device based on a distributed microphone array in the present disclosure may also obtain a weighted third cross-correlation function by performing weighting on each first cross-correlation function of each sub-array based on the PHAT manner and a preset spectrum weighting function, calculate a mean value of third cross-correlation functions of each sub-array based on each frame of data of the received awakening voice signal, and then determine a sub-array corresponding to a maximum mean value as an awakened sub-array, where the mean value represents a magnitude of a signal received by a corresponding sub-array. In this way, the awakened sub-array is determined based on a frequency domain sphere correlation characteristics decision algorithm. With introduced PHAT and spectrum weighting, the capabilities of interference resistance, noise resistance and reverberation resistance become strong. In addition, angular information carried by SRP algorithm allows a plurality of devices to accurately determine an interaction intention of an awakener based on an orientation when the devices are close to the awakener and then a correct awakened device is selected, thereby further improving the accuracy of the awakening decision of the distributed device.

After considering the specification and practicing the present disclosure, the persons of skill in the prior art may easily conceive of other implementations of the present disclosure. The present disclosure is intended to include any variations, uses and adaptive changes of the present disclosure. These variations, uses and adaptive changes follow the general principle of the present disclosure and include common knowledge or conventional technical means in the prior art not disclosed in the present disclosure. The specification and examples herein are intended to be illustrative only and the real scope and spirit of the present disclosure are indicated by the claims of the present disclosure.

It is to be understood that the present disclosure is not limited to the precise structures described above and shown in the accompanying drawings and may be modified or changed without departing from the scope of the present disclosure. The scope of protection of the present disclosure is limited only by the appended claims.

What is claimed is:

1. A method of processing voice, the method being applied to a decision-making device in communication with a distributed microphone array, the distributed microphone array comprising a plurality of sub-arrays, and the method comprising:

obtaining, for each sub-array, an awakening voice signal received by each microphone of each sub-array;

determining, for each sub-array, a frequency domain signal corresponding to each awakening voice signal of each sub-array, and a first cross-correlation function between every two frequency domain signals; and determining an awakened sub-array by a corresponding awakening voice signal in the plurality of sub-arrays based on each first cross-correlation function for each sub-array by:

calculating, for each sub-array, a mean value of each first cross-correlation function of the sub-array based on each frame of data of the received awakening voice signal, wherein the mean value represents a magnitude of a signal received by a corresponding sub-array; and determining the sub-array corresponding to a maximum mean value as the awakened sub-array.

2. The method according to claim 1, wherein calculating, for each sub-array, the mean value of each first cross-correlation function of the sub-array based on each frame of data of the received awakening voice signal comprises:

obtaining a weighted second cross-correlation function by performing weighting on each first cross-correlation function of each sub-array in a phase transform weighting (PHAT) manner; and calculating, for each sub-array, a second mean value of each second cross-correlation function of the sub-array based on each frame of data of the received awakening voice signal.

3. The method according to claim 1, wherein calculating, for each sub-array, the mean value of each first cross-correlation function of the sub-array based on each frame of data of the received awakening voice signal comprises:

obtaining a weighted third cross-correlation function by performing weighting on each first cross-correlation function of each sub-array according to a phase transform weighting (PHAT) manner and a preset spectrum weighting function; and calculating, for each sub-array, a third mean value of each third cross-correlation function of the sub-array based on each frame of data of the received awakening voice signal.

4. The method according to claim 3, wherein a weight value of the preset spectrum weighting function corresponds to a signal-to-noise ratio of each microphone of the sub-array.

5. The method according to claim 3, wherein calculating, for each sub-array, the third mean value of each third cross-correlation function of the sub-array comprises:

setting a spherical mesh, wherein the spherical mesh comprises a plurality of discrete points;

determining, for each sub-array, values of each third cross-correlation function of the sub-array at each discrete point; and calculating, for each sub-array, a mean value of the values of each third cross-correlation function of the sub-array based on the values of each third cross-correlation function of the sub-array.

6. An apparatus for processing voice, the apparatus being applied to a decision-making device in communication with a distributed microphone array, the distributed microphone array comprising a plurality of sub-arrays, and the apparatus comprising:

a processor, and a storage medium storing instructions executable by the processor;

wherein, when the processor executes the instructions, the processor is caused to:

obtain, for each sub-array, an awakening voice signal received by each microphone of the sub-array;

determine, for each sub-array, a frequency domain signal corresponding to each awakening voice signal of the sub-array, and a first cross-correlation function between every two frequency domain signals; and determine an awakened sub-array by a corresponding awakening voice signal in the sub-arrays based on each first cross-correlation function of each sub-array by the processor being further caused to:

calculate, for each sub-array, a mean value of each first cross-correlation function of the sub-array based on each frame of data of the received awakening voice signal, wherein the mean value represents a magnitude of a signal received by a corresponding sub-array; and determine the sub-array corresponding to a maximum mean value as the awakened sub-array.

7. The apparatus according to claim 6, wherein when calculating, for each sub-array, the mean value of each first cross-correlation function of the sub-array based on each frame of data of the received awakening voice signal, the processor is further caused to:

obtain a weighted second cross-correlation function by performing weighting on each first cross-correlation function of each sub-array in a phase transform weighting (PHAT) manner; and calculate, for each sub-array, a second mean value of each second cross-correlation function of the sub-array based on each frame of data of the received awakening voice signal.

8. The apparatus according to claim 6, wherein when calculating, for each sub-array, the mean value of each first cross-correlation function of the sub-array based on each frame of data of the received awakening voice signal, the processor is further caused to:

obtain a weighted third cross-correlation function by performing weighting on each first cross-correlation function of each sub-array according to a phase transform weighting (PHAT) manner and a preset spectrum weighting function; and calculate, for each sub-array, a third mean value of each third cross-correlation function of the sub-array based on each frame of data of the received awakening voice signal.

9. The apparatus according to claim 8, wherein a weight value of the preset spectrum weighting function corresponds to a signal-to-noise ratio of each microphone of the sub-array.

10. The apparatus according to claim 8, wherein when calculating, for each sub-array, the third mean value of each third cross-correlation function of the sub-array, the processor is further caused to:

set a spherical mesh, wherein the spherical mesh comprises a plurality of discrete points; determine, for each sub-array, values of each third cross-correlation function of the sub-array at each discrete point; and calculate, for each sub-array, a mean value of the values of each third cross-correlation function of the sub-array based on the values of each third cross-correlation function of the sub-array.

11. A system for processing voice, the system comprising:

a decision-making device in communication with a distributed microphone array, the distributed microphone array comprising a plurality of sub-arrays, wherein the system is configured to:

obtain a digital voice signal from each microphone of each sub-array when each sub-array receives an awakening voice signal;

determine a frequency domain signal corresponding to each digital voice signal of each sub-array, and a first cross-correlation function between every two frequency domain signals; and select an awakened sub-array corresponding to the awakening voice signal in the plurality of sub-arrays based on each first cross-correlation function for each sub-array by the system being further configured to:
calculate a mean value of each first cross-correlation function of the sub-array based on each frame of data of the digital voice signal, wherein the mean value represents a magnitude of a signal received by a corresponding sub-array; and
determine the sub-array corresponding to a maximum mean value as the awakened sub-array.

12. The system according to claim 11, wherein the system is configured to:
obtain a weighted second cross-correlation function by performing weighting on each first cross-correlation function of each sub-array in a phase transform weighting (PHAT) manner; and
calculate, for each sub-array, a second mean value of each second cross-correlation function of the sub-array based on each frame of data of the received awakening voice signal.

13. The system according to claim 11, wherein the system is configured to:
obtaining a weighted third cross-correlation function by performing weighting on each first cross-correlation function of each sub-array according to a phase transform weighting (PHAT) manner and a preset spectrum weighting function; and
calculating, for each sub-array, a third mean value of each third cross-correlation function of the sub-array based on each frame of data of the received awakening voice signal.

14. The system according to claim 13, wherein a weight value of the preset spectrum weighting function corresponds to a signal-to-noise ratio of each microphone of the sub-array.

15. The system according to claim 13, wherein the system is configured to:
set a spherical mesh, wherein the spherical mesh comprises a plurality of discrete points;
determine, for each sub-array, values of each third cross-correlation function of the sub-array at each discrete point; and
calculate, for each sub-array, a mean value of the values of each third cross-correlation function of the sub-array based on the values of each third cross-correlation function of the sub-array.

* * * * *